A. W. LIVINGSTON.
TIRE.
APPLICATION FILED SEPT. 22, 1913.
1,127,038.
Patented Feb. 2, 1915.
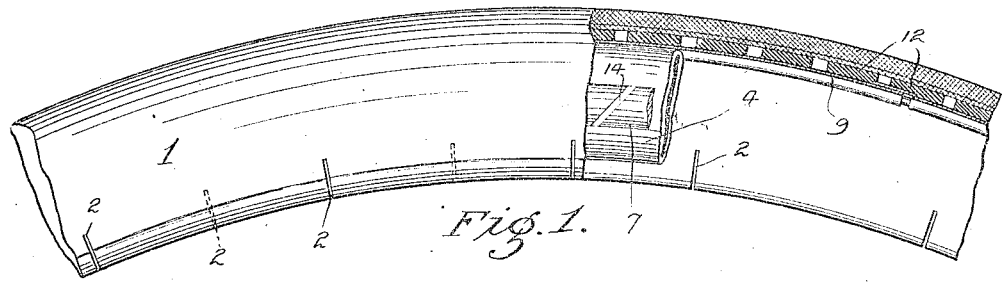
Fig. 1.
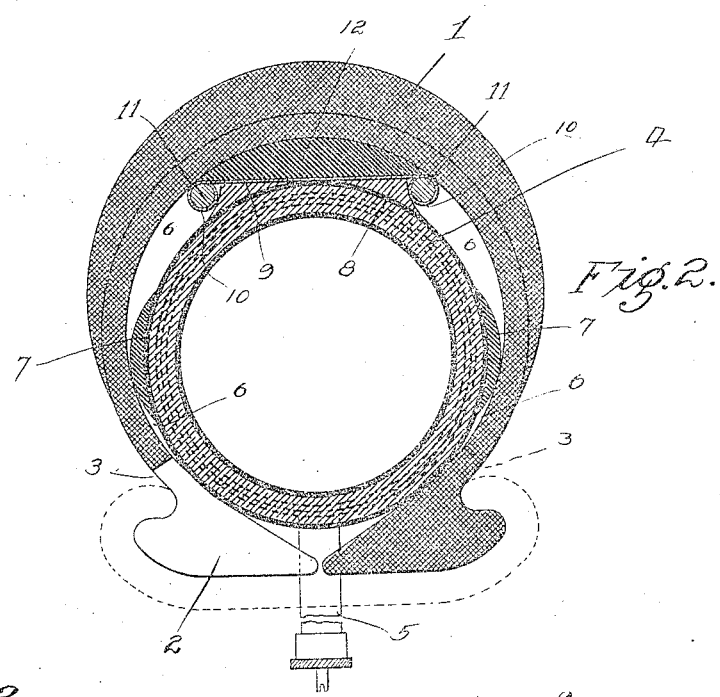
Fig. 2.
Fig. 3.
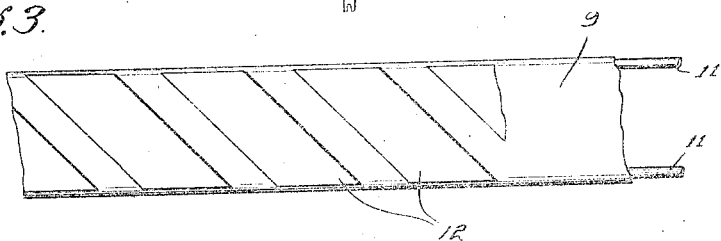
WITNESSES:
H. A. Stock
F. P. Schroeder
INVENTOR
Andrew W. Livingston
BY Harry C. Schroeder
ATTORNEY

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

TIRE.

1,127,038.  Specification of Letters Patent.  Patented Feb. 2, 1915.

Continuation in part of application Serial No. 747,341, filed February 10, 1913. This application filed September 22, 1913. Serial No. 791,099.

*To all whom it may concern:*

Be it known that I, ANDREW W. LIVINGSTON, a citizen of the United States, residing at Oakland, in the county of Alameda and State of California, have invented certain new and useful Improvements in Tires, of which the following is a specification.

This invention relates to improvements in pneumatic tires of the puncture proof type, the objects of my invention being to provide a metallic armor therefor and means for ventilating the interior of the tire to do away with the heat of compression generated within the inner tube.

This application is a continuation of my prior application numbered 747,341 filed February 10, 1913, and contains a modified form of the matter divided from said prior application in response to action dated March 22, 1913.

With these objects in view my invention consists in the novel construction of a casing as herein described and as more particularly pointed out in the claims hereto appended.

Referring to the accompanying drawing wherein like numerals refer to the same parts in the several views, Figure 1 is a view in elevation of a portion of a tire constructed in accordance with my invention. Fig. 2 is an enlarged sectional view therethrough. Fig. 3 is a view in plan of a portion of the armor used on this tire.

My improved tire consists of the outer casing 1 which may be made in any of the regular sizes and shapes such as clencher, demountable rim, or straight sided. This casing is provided with a plurality of transverse slits 2 extending from the base to a point above the rim as shown at 3. These slits are made very narrow that while allowing egress and entrance of air, they will not permit the passage of sand, dirt or other foreign matter. The slits in opposite walls I prefer to place in staggered relation and it will be understood that other forms of openings such as circular holes or circumferential slots may be used. Within this casing is placed the inner pneumatic tube 4 which is of such construction that it alone is capable of withstanding the required air pressure. The usual inflating valve 5 is provided and when under pressure this tube assumes a circular shape which does not entirely fill the outer casing, interstices 6 being left therebetween. In use the air in these interstices becomes heated by conduction from the air within tube 4 and as the tire moves along the ground this air is constantly being compressed and forced out, new air drawn in through the slits 2 whenever the pressure is changed or removed. On the sides of tube 4 are vulcanized rounded ribs 7 which prevent the casing 1 from bending inwardly at this point and on the other circumference of the tube 4 is vulcanized a strip 8 having a flat periphery to receive the armor 9. The latter is in the form of a thin metallic strip having the beaded edges 10, which may be reinforced by a wire 11. On the outside of this strip are vulcanized diagonal strips 12 for the purpose of supporting the segment of tire adjacent the same.

It will be seen from the foregoing that I have provided an improved punctureproof tire, and one having a longer life than the usual type on account of the lack of deterioration due to heat generated within the inner tube by the movement of the car. The cheek strips 7 may also be provided with slits 14 which allow the passage of air from the interstices 6 to the slits 2. While this is the present and preferred construction, it will be understood in practice such changes may be made in form and detail of construction as do not depart from the spirit of the invention.

What I claim as new and wish to cover by Letters Patent is:—

1. A pneumatic tire comprising an outer casing, an inner tube capable of withstanding pressure and means for inflating said tube, circumferential strips on the exterior of said tube to support said casing and form interstices therebetween, diagonally disposed slots in said strips giving communication between said interstices and slits in the side walls of said casing communicating with said interstices, allowing air to pass in and out of said interstices for the purpose herein set forth.

2. A pneumatic tire comprising an outer casing, an inner tube capable of withstanding pressure and means for inflating said tube, circumferential strips on the exterior of said inner tube for the purpose of supporting said outer tube and forming interstices therebetween, diagonally disposed slots in said strips to give communication between said interstices, a continuous metal protector around the circumference of said inner tube diagonal rubber blocks spaced on said protector for the purpose of supporting the tread portion of said outer casing, radial slits in the base of said casing extending above the supporting rim whereby the air may circulate in and out of said interstices between said casing and said inner tube.

3. A pneumatic tire comprising an outer casing, an inner tube capable of withstanding the required pressure, a flat strip secured to the outer surface of said inner tube, a metal strip arranged outside of said flat strip, and provided with beaded edges, blocks intermediate said metallic strip and said outer casing, and ring-like members arranged within said beads.

In testimony whereof I affix my signature in presence of two witnesses.

ANDREW W. LIVINGSTON.

Witnesses:
R. M. OYARZO,
J. M. BENHAM.